US012753517B2

(12) United States Patent
Chen et al.

(10) Patent No.: US 12,753,517 B2
(45) Date of Patent: Oct. 6, 2026

(54) GAS-LESS ELUENT GENERATOR

(71) Applicant: DIONEX CORPORATION, Sunnyvale, CA (US)

(72) Inventors: Yongjing Chen, Santa Clara, CA (US); Yan Liu, Palo Alto, CA (US)

(73) Assignee: Dionex Corporation, Sunnyvale, CA (US)

( * ) Notice: Subject to any disclaimer, the term of this patent is extended or adjusted under 35 U.S.C. 154(b) by 821 days.

(21) Appl. No.: 18/146,485

(22) Filed: Dec. 27, 2022

(65) Prior Publication Data

US 2024/0209517 A1 Jun. 27, 2024

(51) Int. Cl.

| | |
|---|---|
| ***C25B 9/00*** | (2021.01) |
| ***C25B 1/02*** | (2006.01) |
| ***C25B 1/22*** | (2006.01) |
| ***C25B 11/042*** | (2021.01) |
| ***G01N 30/62*** | (2006.01) |
| *G01N 30/02* | (2006.01) |
| *G01N 30/60* | (2006.01) |

(52) U.S. Cl.

CPC .................. *C25B 1/02* (2013.01); *C25B 1/22* (2013.01); *C25B 11/042* (2021.01); *G01N 30/62* (2013.01); *G01N 2030/027* (2013.01); *G01N 2030/6013* (2013.01)

(58) Field of Classification Search

CPC ........... C25B 1/02; C25B 11/042; C25B 1/22; G01N 30/62; G01N 2030/027; G01N 2030/6013

See application file for complete search history.

(56) References Cited

U.S. PATENT DOCUMENTS

| | | | |
|---|---|---|---|
| 6,036,921 | A | 3/2000 | Small et al. |
| 6,225,129 | B1 | 5/2001 | Liu et al. |
| 6,315,954 | B1 | 11/2001 | Small et al. |
| 6,316,270 | B1 | 11/2001 | Small et al. |
| 6,316,271 | B1 | 11/2001 | Small et al. |
| 6,554,484 | B2 | 4/2003 | Lampert et al. |
| 6,568,245 | B2 | 5/2003 | Kaufman |
| 6,682,701 | B1 | 1/2004 | Liu et al. |
| 8,308,952 | B2 | 11/2012 | Liu et al. |
| 8,647,576 | B2 | 2/2014 | Liu et al. |
| 8,802,011 | B2 | 8/2014 | Liu et al. |
| 9,624,588 | B2 | 4/2017 | Liu et al. |
| 2008/0116139 | A1 | 5/2008 | Liu et al. |
| 2009/0218238 | A1 | 9/2009 | Dagsupta et al. |
| 2014/0069176 | A1 | 3/2014 | Lu et al. |

*Primary Examiner* — Zulmariam Mendez

(57) ABSTRACT

An eluent generation module includes an electrolytic gas generator and an electrolytic eluent generator. The electrolytic gas generator includes a generation chamber having an inlet and an outlet; an outlet electrode within the generation chamber; a first ion exchange connector; a bulk solvent chamber separated from the generation chamber by the ion exchange connector; and a bulk solvent chamber electrode within the bulk solvent chamber. The electrolytic eluent generator includes an electrolyte chamber containing an aqueous electrolyte solution; an electrolyte chamber electrode within the electrolyte chamber; a second ion exchange connector; an eluent generation chamber separated from the electrolyte chamber by the second ion exchange connector; and an eluent generation chamber electrode.

24 Claims, 5 Drawing Sheets

GAS-LESS ELUENT GENERATOR

FIELD

The present disclosure generally relates to the field of ion chromatography including gas-less eluent generators.

INTRODUCTION

Ion chromatography (IC) is a well-established analytical technique and for the past 40 years or so has been the preferred method for the determination of inorganic anions and small organic anions. IC is also used widely for the determination of inorganic cations, as well as carbohydrates and amino acids.

In ion chromatography, dilute solutions of acids, bases, or salts are commonly used as chromatographic separation eluents. Traditionally, these eluents had been prepared off-line by dilution with reagent-grade chemicals. Off-line preparation of chromatographic eluents can be tedious and prone to operator errors, and often introduces contaminants. For example, dilute NaOH solutions, widely used as eluents in the ion chromatographic separation of anions, are easily contaminated by carbonate. The preparation of carbonate-free NaOH eluents is difficult because carbonate can be introduced as an impurity from the reagents or by adsorption of carbon dioxide from air. The presence of carbonate in NaOH eluents can compromise the performance of an ion chromatographic method and can cause an undesirable chromatographic baseline drift during the hydroxide gradient and even irreproducible retention times of target analytes. In recent years, several approaches that utilize the electrolysis of water and charge-selective electromigration of ions through ion-exchange media have been investigated by researchers to purify or generate high-purity ion chromatographic eluents. U.S. Pat. Nos. 6,036,921, 6,225,129, 6,316,271, 6,316,270, 6,315,954, and 6,682,701 describe electrolytic devices that can be used to generate high purity acid and base solutions by using water as the carrier. Using these devices, high purity, contaminant-free acid or base solutions are automatically generated in-line for use as eluents in chromatographic separations.

With the introduction of electrolytic devices for on-line generation of pure eluents, ion chromatography was empowered to advance into a new era. It has since grown at a fast pace due to advantages of using electrolytic eluent generators (EEGs) over the conventional method of manual preparations (such as high purity eluents, excellent concentration reproducibility through precise control of a constant current, ease of use, etc). Electrolytically generated eluents have been widely used in many application areas ranging from environmental protection, biotechnology, pharmaceutical industries, power plants, and food industries, etc.

However, the electrolytic devices often introduce dissolved gases into the eluent as a byproduct of the electrolysis. It can be necessary to remove the dissolved gases, such as by a degasser, prior to use of the eluent in ion chromatography. As such, there is a need for improved EEGs.

SUMMARY

In a first aspect, an eluent generation module can include an electrolytic gas generator and a electrolytic eluent generator. The electrolytic gas generator can include a generation chamber having an inlet and an outlet; an outlet electrode within the generation chamber; a first ion exchange connector; a bulk solvent chamber separated from the generation chamber by the ion exchange connector; and a bulk solvent chamber electrode within the bulk solvent chamber. The electrolytic eluent generator can include an electrolyte chamber containing an aqueous electrolyte solution; an electrolyte chamber electrode within the electrolyte chamber; a second ion exchange connector; an eluent generation chamber separated from the electrolyte chamber by the second ion exchange connector; and an eluent generation chamber electrode.

In various embodiments of the first aspect, the electrolytic eluent generator can be configured to generate an acid eluent, the second ion exchange connector can include an anion exchange barrier, the electrolyte chamber electrode can be a cathode, the eluent generation chamber electrode can be an anode. In embodiments, the electrolytic gas generator can be configured to generate $H_2$ at the outlet to combine with $O_2$ generated at the eluent generation chamber electrode, the first ion exchange connector can include an anion exchange barrier, and the outlet electrode can be a cathode, the bulk solvent chamber electrode can be an anode. The aqueous electrolyte solution can include carbonic acid, sulfuric acid, phosphoric acid, acetic acid, methanesulfonic acid, or any combination thereof. In particular embodiments, the generation chamber can include an anion exchange bed.

In various embodiments of the first aspect, the eluent generation module can be configured to generate a base eluent, the second ion exchange connector can include a cation exchange barrier, the electrolyte chamber electrode can be an anode, the eluent generation chamber electrode can be a cathode. In embodiments, the electrolytic gas generator can be configured to generate $O_2$ at the outlet to combine with $H_2$ generated at the eluent generation chamber electrode, the first ion exchange connector can include a cation exchange barrier, and the outlet electrode can be an anode, the bulk solvent chamber electrode can be a cathode. The aqueous electrolyte solution can include potassium hydroxide, sodium hydroxide, lithium hydroxide, other alkali hydroxides, or any combination thereof. In particular embodiments, the generation chamber can include a cation exchange bed.

In various embodiments of the first aspect, the outlet electrode can be a perforated platinum electrode.

In a second aspect, a method of generating a gas-free base eluent can include supplying a liquid to an inlet of an electrolytic gas generator. The electrolytic gas generator can include a generation chamber having the inlet and an outlet; an outlet anode within the generation chamber; a first cation exchange connector; a bulk solvent chamber separated from the generation chamber by the cation exchange connector; and a bulk solvent chamber cathode within the bulk solvent chamber. The method can further include applying a current across the outlet anode and the bulk solvent chamber cathode to generate $O_2$ at the outlet anode; and providing a liquid stream containing oxygen gas from the outlet to an electrolytic eluent generator. The electrolytic eluent generator can include an electrolyte chamber containing an aqueous electrolyte solution, an electrolyte chamber anode within the electrolyte chamber, a second cation exchange connector, an eluent generation chamber separated from the electrolyte chamber by the second cation exchange connector; and an eluent generation chamber cathode. The method can further include applying a current across the electrolyte chamber anode and the eluent generation chamber cathode to migrate electrolyte ions from the electrolyte chamber across the second cation exchange connector to form the base eluent in the eluent generation chamber; and reacting the $O_2$ with $H_2$ formed at the eluent generation chamber cathode to produce the gas-free base eluent.

In various embodiments of the second aspect, the aqueous electrolyte solution can include potassium hydroxide, sodium hydroxide, lithium hydroxide, other alkali hydroxides, or any combination thereof.

In various embodiments of the second aspect, the outlet anode can be a perforated platinum anode.

In various embodiments of the second aspect, the gas-free base eluent can contain less than about 0.2 ml of gas per ml of eluent, such as less than about 0.1 ml of gas per ml of eluent, even less than about 0.05 ml of gas per ml of eluent.

In various embodiments, the second aspect can further include injecting a sample onto a chromatography column; varying the current applied across the generation chamber anode and the bulk solvent chamber cathode of the electrolytic gas generator and varying the current applied across the electrolyte chamber anode and the eluent generation chamber cathode to vary the concentration of the gas-free base eluent; supplying the gas-free base eluent to the chromatography column; eluting sample analytes from the chromatography column; and detecting the sample analytes using a detector.

In a third aspect, a method of generating a gas-free acid eluent, can include supplying a liquid to an inlet of an electrolytic gas generator. The electrolytic gas generator can include a generation chamber having the inlet and an outlet; an outlet cathode within the generation chamber; a first anion exchange connector; a bulk solvent chamber separated from the generation chamber by the anion exchange connector; and a bulk solvent chamber anode within the bulk solvent chamber. The method can further include applying a current across the outlet cathode and the bulk solvent chamber anode to generate $H_2$ at the outlet cathode; and providing a liquid stream containing hydrogen gas from the outlet to an electrolytic eluent generator. The electrolytic eluent generator can include an electrolyte chamber containing an aqueous electrolyte solution, an electrolyte chamber cathode within the electrolyte chamber, a second anion exchange connector, an eluent generation chamber separated from the electrolyte chamber by the second anion exchange connector; and an eluent generation chamber anode. The method can further include applying a current across the electrolyte chamber cathode and the eluent generation chamber anode the migrate electrolyte ions from the electrolyte chamber across the second anion exchange connector to form the acid eluent in the eluent generation chamber; and reacting the $H_2$ with $O_2$ formed at the eluent generation chamber anode to produce the gas-free acid eluent.

In various embodiments of the third aspect, the aqueous electrolyte solution can include carbonic acid, sulfuric acid, phosphoric acid, acetic acid, methanesulfonic acid, or any combination thereof.

In various embodiments of the third aspect, the outlet electrode can be a perforated platinum electrode.

In various embodiments of the third aspect, the gas-free acid eluent can contain less than about 0.2 ml of gas per ml of eluent, such as less than about 0.1 ml of gas per ml of eluent, even less than about 0.05 ml of gas per ml of eluent.

In various embodiments, the third aspect can further include injecting a sample onto a chromatography column; varying the current applied across the generation chamber cathode and the bulk solvent chamber anode of the electrolytic gas generator and varying the current applied across the electrolyte chamber cathode and the eluent generation chamber anode to vary the concentration of the gas-free acid eluent; supplying the gas-free acid eluent to the chromatography column; eluting sample analytes from the chromatography column; and detecting the sample analytes using a detector.

DRAWINGS

For a more complete understanding of the principles disclosed herein, and the advantages thereof, reference is now made to the following descriptions taken in conjunction with the accompanying drawings, in which.

Figure 1:
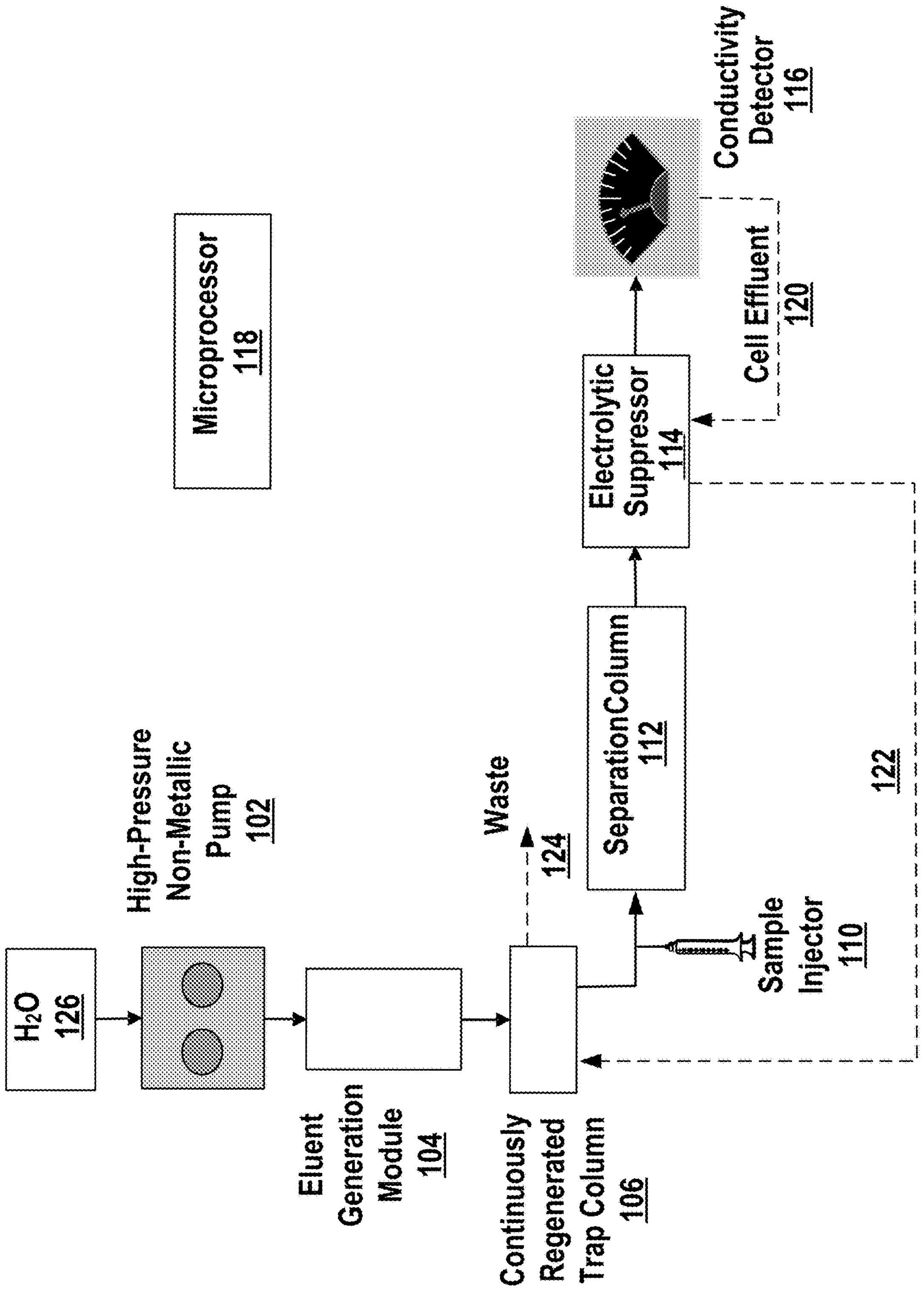
FIG. 1 illustrates a chromatography system that includes an eluent generation module, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of gas-less eluent generators and methods of use are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Chromatography System

FIG. 1 illustrates an embodiment of a chromatography system 100. Chromatography system 100 may include a pump 102, an eluent generation module 104, a continuously regenerated trap column 106, a sample injector 110, a chromatographic separation column 112, an electrolytic suppressor 114, a detector 116, and a microprocessor 118. Chromatographic separation column 112 may be in the form of a capillary column or an analytical column. A recycle line 120 may be used to transfer the liquid from an output of detector 116 to an inlet of the electrolytic suppressor 114, recycle line 122 may be used to transfer liquid from an outlet of electrolytic suppressor 114 to an inlet of continuously regenerated trap column 106, and recycle line 124 may be used to transfer liquid from an outlet of continuously regenerated trap column 106 to waste.

Pump 102 can be configured to pump a liquid from a liquid source 126 and be fluidically connected to eluent generation module 104. In an embodiment, the liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyetheretherketone (PEEK) or at least coated with a PEEK lining, which does not leach out a significant number of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Eluent generation module 104 is configured to generate a generant. A generant refers to a particular species of acid, base, or salt that can be added to the eluent. In an embodiment, the generant may be a base such as cation hydroxide or the generant may be an acid such as carbonic acid, sulfuric acid, phosphoric acid, acetic acid, methanesulfonic acid (MSA), or a combination thereof. In various embodiments, the cation hydroxide can include potassium hydroxide, sodium hydroxide, lithium hydroxide, other alkali hydroxides, or any combination thereof.

Referring to FIG. 1, eluent generation module 104 can be configured to receive the liquid from pump 102 and then add a generant to the liquid. The liquid containing the generant can be outputted from eluent generator 104 to an inlet of continuously regenerated trap column 106.

Optional continuously regenerated trap column 106 is configured to remove cationic or anionic contaminants from the eluent. Continuously regenerated trap column 106 can include an ion exchange bed with an electrode at the eluent outlet. An ion exchange membrane interface can separate the eluent from a second electrode and contaminate ions can be swept through the ion exchange membrane towards the second electrode. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane. The flowing eluent can be outputted from the continuously regenerated trap column 106 to sample injector 110 with a substantial portion of the contaminates removed. The contaminate ions can be swept out of regenerated trap column 106 using a recycled liquid via a recycle line 122 that is downstream of electrolytic suppressor 114. The recycled liquid containing the removed contaminates can be outputted from the continuously regenerated trap column 106 via a waste line 124.

Sample injector 110 can be used to inject a bolus of a liquid sample into an eluent stream. The liquid sample may include a plurality of chemical constituents (i.e., matrix components) and one or more analytes of interest.

Chromatographic separation column 112 can be used to separate various matrix components present in the liquid sample from the analyte(s) of interest. Typically, chromatographic separation column 112 may be in the form of a hollow cylinder that contains a packed stationary phase. As the liquid sample flows through chromatographic separation column 112, the matrix components and target analytes can have a range of retention times for eluting off of chromatographic separation column 112. Depending on the characteristics of the target analytes and matrix components, they can have different affinities to the stationary phase in chromatographic separation column 112. An output of chromatographic separation column 112 can be fluidically connected to the electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression chamber separated by ion exchange membranes. The anode chamber and/or cathode chamber can produce regenerate ions. The eluent suppression chamber can include a flow path for the eluent separated from the regenerant by an ion exchange barrier and eluent counterions can be exchanged with regenerate ions across the ion exchange barrier. The cathode chamber or anode chamber can be supplied a recycled liquid via a recycle line 120 that is downstream of conductivity detector 116. An output of electrolytic suppressor 114 can be fluidically connected to detector 116 to measure the presence of the separated chemical constituents of the liquid sample.

As illustrated in FIG. 1, the fluidic output of the eluent from detector 116 is recycled to electrolytic suppressor 114 via recycle line 120, the fluidic output of the electrolytic suppressor 114 is recycled to continuously regenerated trap column 106 via recycle line 122, and the fluidic output of the continuously regenerated trap column 106 flows to waste via waste line 124.

Detector 116 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. Detector 116 may also be in the form of a mass spectrometer or a charged aerosol detector, where an external flow of regenerant replacing recycle line 120 is supplied to electrolytic suppressor 114. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 118, a timer, and a memory portion. In addition, the electronic circuit may include a power supply that are configured to apply a controlling signal, respectively. Microprocessor 118 can be used to control the operation of chromatography system 100. Microprocessor 118 may either be integrated into chromatography system 100 or be part of a personal computer that communicates with chromatography system 100. Microprocessor 118 may be configured to communicate with and control one or more components of chromatography system such as pump 102, eluent generator 104, sample injector 110, and detector 116. The memory portion may be used to store instructions to set the magnitude and timing of the current waveform with respect to the switching of sample injector 110 that injects the sample.

Figure 2:
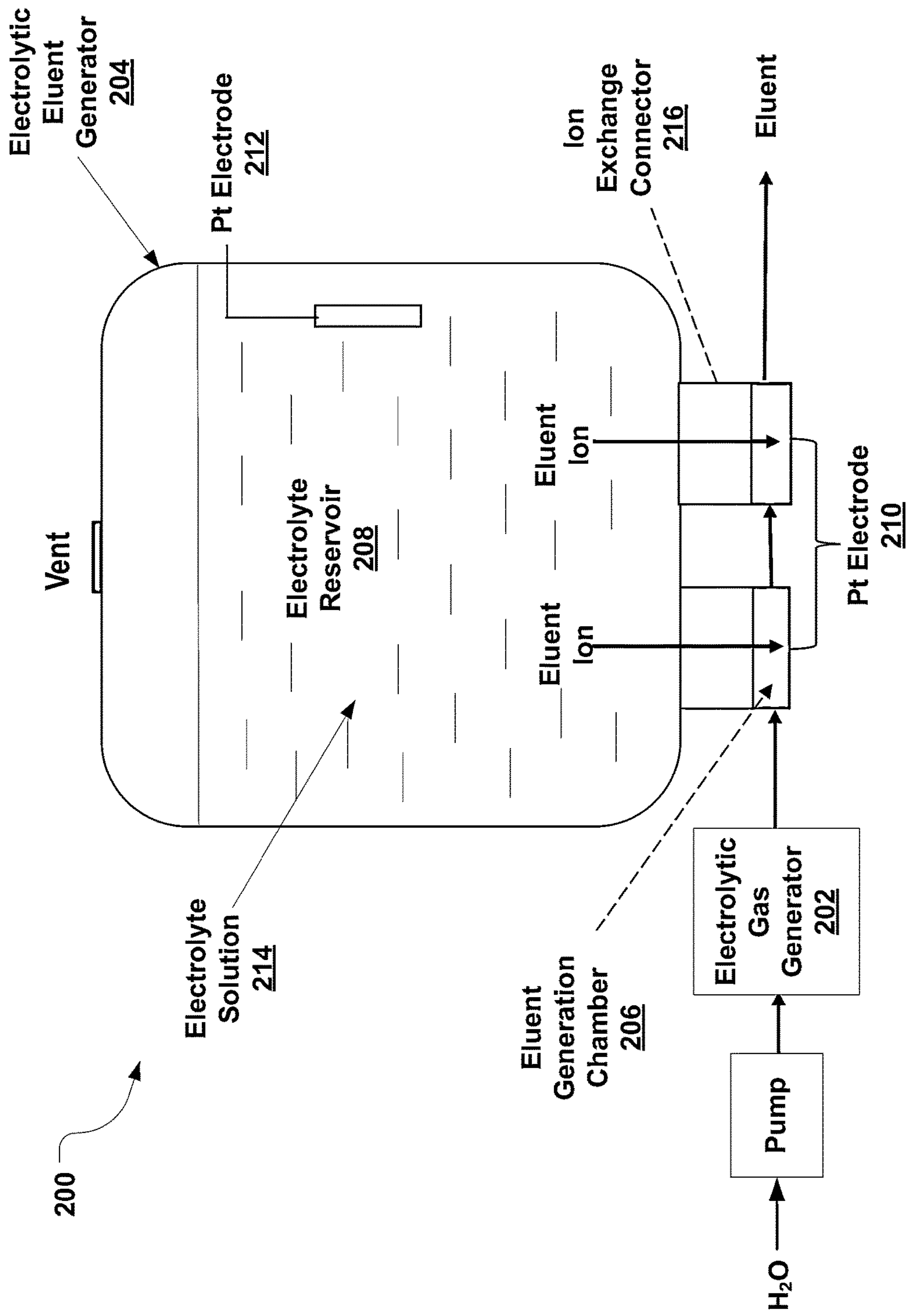
FIG. 2 illustrates an eluent generator module, in accordance with various embodiments.

FIG. 2 illustrates the operation principle of an eluent generation module 200. Eluent generation module 200 can include an electrolytic gas generator 202 and an electrolytic eluent generator 204. Electrolytic gas generator 202 can be configured to electrolytically produce dissolved gases, such as $O_2$ or $H_2$, to react with electrolytically produced gases from the electrolytic eluent generator 204, resulting in a substantially gas free eluent. Embodiments of electrolytic gas generator 202 are described in more detail in FIGS. 3A and 3B.

The electrolytic eluent generator 204 can include a high-pressure eluent generation chamber 206 and a low-pressure electrolyte reservoir 208. In various embodiments, the high-pressure generation chamber 206 can operate pressures greater than about 2,000 psi, such as at least about 5,000 psi, even at least about 10,000 psi, but not greater than about 30,000 psi, such as not greater than about 15,000 psi.

The eluent generation chamber 206 can contain a perforated platinum (Pt) electrode 210. The electrolyte reservoir 208 can contain a Pt electrode 212 and an electrolyte solution 214. In various embodiments, the electrolytic eluent generator 204 can produce a base, such as potassium hydroxide (KOH), sodium hydroxide (NaOH), or lithium hydroxide (LiOH). Electrode 210 can be a cathode where hydroxide ions can be formed, and electrode 212 can be an anode. In other embodiments, the electrolytic eluent generator 204 can produce an acid, such as carbonic acid, sulfuric acid, phosphoric acid, acetic acid, methanesulfonic acid, electrode 210 can be an anode where hydronium ions can be formed, and electrode 212 can be a cathode. The eluent generation chamber 206 can be connected to the electrolyte reservoir 208 by means of an exchange connector 216 which can permit the passage of ions of only one charge from the electrolyte reservoir 208 into the high-pressure generation chamber 206. The exchange connector 216 can also serve the critical role of a high-pressure physical barrier between the low-pressure electrolyte reservoir 208 and the high-pressure generation chamber 206. In various embodiments, where the electrolytic eluent generator 204 is a base generator, the exchange connector 216 can permit the passage of cations while substantially preventing the passage of anions from the electrolyte reservoir 208 into the generation chamber 206. In alternate embodiments where the electrolytic eluent generator 204 is an acid generator, the exchange connector 216 can permit the passage of anions while substantially preventing the passage of cations from the electrolyte reservoir 208 into the generation chamber 206.

In various embodiments, the eluent generation chamber 206 and the ion exchange connector 216 can be assembled into an eluent generation cartridge.

To generate a base eluent, such as KOH, NaOH, or LiOH, deionized water can be pumped through the eluent generation chamber 206 and a DC current can be applied between the electrode 210 and electrode 212. Under the applied electric field, the electrolysis of water can occur at both the electrode 210 and electrode 212 of the electrolytic eluent generator 204. Water can be oxidized to form $H^+$ ions and oxygen gas at electrode 212 in the electrolyte reservoir 208: $H_2O \rightarrow 2H^+ + \frac{1}{2}O_2\uparrow + 2e^-$. Water can be reduced to form OH— ions and hydrogen gas at electrode 210 in the eluent generation chamber 206: $2H_2O + 2e^- \rightarrow 2\ OH^- + H_2\uparrow$. As $H^+$ ions, generated at the anode 212, displace $K^+$ ions in the electrolyte reservoir 208, the displaced ions can migrate across the cation exchange connector 216 into the eluent generation chamber 206. These $K^+$ ions can combine with hydroxide ions generated at the cathode 210 to produce the KOH solution, which can be used as the eluent for anion exchange chromatography. Additionally, oxygen gas produced by the electrolytic gas generator 202 can react with the hydrogen gas formed at electrode 210 to form water and substantially eliminate the electrolytically produced gases from the eluent stream. The concentration of generated KOH can be determined by the current applied to the electrolytic eluent generator 204 and the carrier water flow rate through the generation chamber 206. Further, the current applied to the electrolytic gas generator 202 can be adjusted to stoichiometrically match the oxygen gas production of the electrolytic gas generator 202 to the hydrogen gas production at cathode 210.

To generate an acid eluent, such as carbonic acid, sulfuric acid, phosphoric acid, acetic acid, or methanesulfonic acid, deionized water can be pumped through the eluent generation chamber 206 and a DC current can be applied between the electrode 210 and electrode 212. Under the applied field, the electrolysis of water can occur at both the electrode 210 and electrode 212 of the electrolytic eluent generator 204. Water can be oxidized to form $H^+$ ions and oxygen gas at the electrode 210 in the methanesulfonic acid generation chamber 206: $H_2O \rightarrow 2H^+ + \frac{1}{2}\ O_2\uparrow + 2e^-$. Water can be reduced to form $OH^-$ ions and hydrogen gas at the electrode 212 in the electrolyte reservoir 208: $2H_2O + 2e^- \rightarrow 2\ OH^- + H_2\uparrow$. As $OH^-$ ions, generated at the electrode 212, displaces methanesulfonate ions in the electrolyte reservoir 208, the displaced ions can migrate across the anion exchange connector 216 into the eluent generation chamber 206. These methanesulfonate ions can combine with hydronium ions generated at the electrode 210 to produce the methanesulfonic acid solution, which can be used as the eluent for cation exchange chromatography. Additionally, hydrogen gas produced by the electrolytic gas generator 202 can react with the oxygen gas formed at electrode 210 to form water and substantially eliminate the electrolytically produced gases from the eluent stream. The concentration of generated methanesulfonic acid can be determined by the current applied to the electrolytic eluent generator 204 and the carrier water flow rate through the generation chamber 206. Further, the current applied to the electrolytic gas generator 202 can be adjusted to stoichiometrically match the hydrogen gas production of the electrolytic gas generator 202 to the oxygen gas production at anode 210.

Figure 3A:
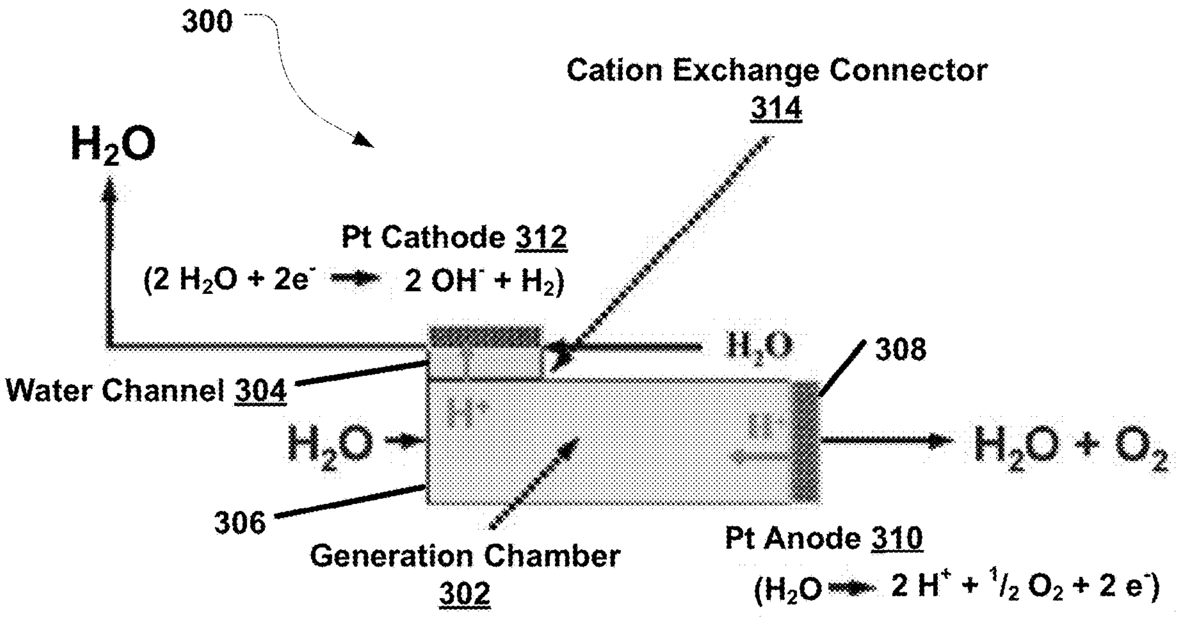
FIGS. 3A and 3B illustrate electrolytic gas generators, in accordance with various embodiments.

FIG. 3A illustrates an electrolytic gas generator 300 for use with an electrolytic eluent generator to produce a base eluent, such as KOH, NaOH, or LiOH. Electrolytic gas generator 300 includes a generation chamber 302 and a bulk solvent chamber 304. Generation chamber 302 has an inlet 306 for receiving liquid and an outlet 308 to supply liquid to the electrolytic eluent generator. Pt anode 310 can be located at the outlet of the generation chamber and Pt cathode 312 can be located within the bulk solvent chamber 304. A cation exchange connector 314 can separate the generation chamber 302 from the bulk solvent chamber 304.

A DC current can be applied between Pt anode 310 and Pt cathode 312. Under the applied electric field, the electrolysis of water can occur at both the Pt anode 310 and Pt cathode 312. Water can be oxidized to form $H^+$ ions and oxygen gas at Pt anode 310 in the generation chamber 302: $H_2O \rightarrow 2H^+ + \frac{1}{2}O_2\uparrow + 2e^-$. Water can be reduced to form $OH^-$ ions and hydrogen gas at Pt cathode 312 in the bulk solvent chamber 304: $2H_2O+2e^- \rightarrow 2\ OH^- + H_2\uparrow$. The $H^+$ ions, generated at the Pt anode 310 can migrate across the cation exchange connector 314 into the bulk solvent chamber 304. These $H^+$ ions can combine with hydroxide ions generated at the Pt cathode 312 to produce water. Additionally, the oxygen gas produced at the Pt anode 310 can enter the eluent stream and flow to the electrolytic eluent generator, where it can react with hydrogen gas electrolytically produced by the electrolytic eluent generator to form water and substantially eliminate gas from the eluent stream. The amount of oxygen gas can be determined by the current applied to the electrolytic gas generator 300 and the carrier water flow rate through the generation chamber 302. The oxygen gas production can be matched to the hydrogen gas production of the electrolytic eluent generator such that stoichiometric amounts of oxygen gas and hydrogen gas can be reacted at the electrolytic eluent generator.

Figure 3B:
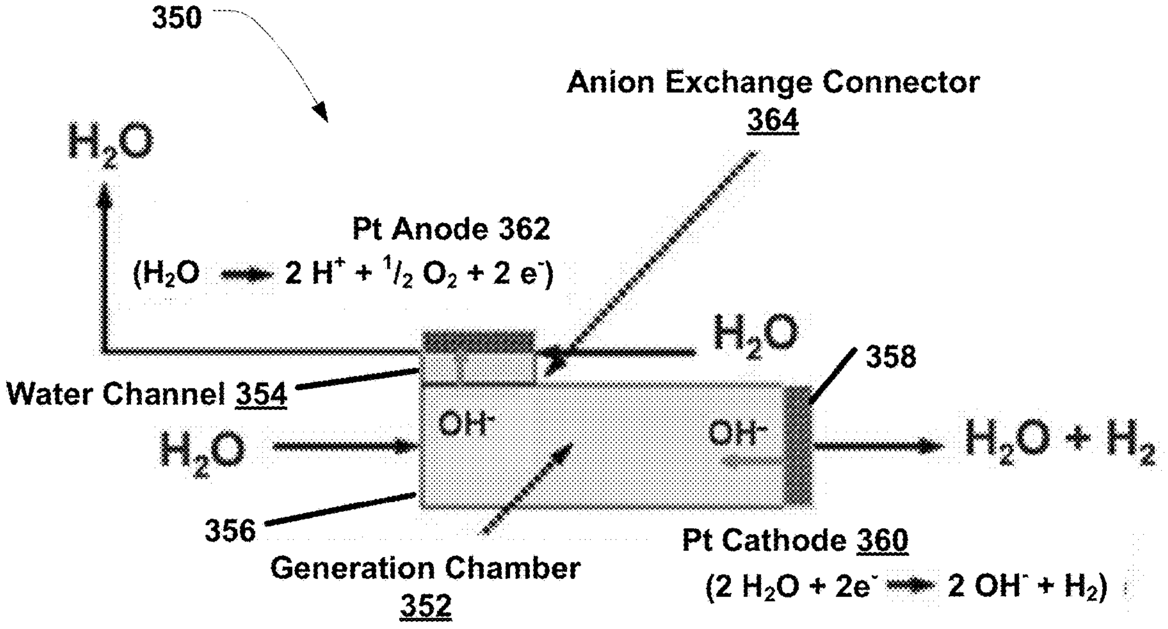

FIG. 3B illustrates an electrolytic gas generator 350 for use with an electrolytic eluent generator to produce an acid eluent such as carbonic acid, sulfuric acid, phosphoric acid, acetic acid, methanesulfonic acid. Electrolytic gas generator 350 includes a generation chamber 352 and a bulk solvent chamber 354. Generation chamber 352 has an inlet 356 for receiving liquid and an outlet 358 to supply liquid to the electrolytic eluent generator. Pt cathode 360 can be located at the outlet of the generation chamber and Pt anode 362 can be located within the bulk solvent chamber 354. An anion exchange connector 314 can separate the generation chamber 352 from the bulk solvent chamber 354.

A DC current can be applied between Pt anode 362 and Pt cathode 360. Under the applied electric field, the electrolysis of water can occur at both the Pt anode 362 and Pt cathode 360. Water can be oxidized to form $H^+$ ions and oxygen gas at Pt anode 362 in the bulk solvent chamber 354: $H_2O \rightarrow 2H^+ + \frac{1}{2}O_2\uparrow + 2e^-$. Water can be reduced to form $OH^-$ ions and hydrogen gas at Pt cathode 360 in the generation chamber 352: $2H_2O+2e^- \rightarrow 2\ OH^- + H_2\uparrow$. The $OH^-$ ions, generated at the Pt cathode 360 can migrate across the anion exchange connector 364 into the bulk solvent chamber 354. These $OH^-$ ions can combine with hydroxide ions generated at the Pt anode 362 to produce water. Additionally, the hydrogen gas produced at the Pt cathode 360 can enter the eluent stream and flow to the electrolytic eluent generator, where it can react with oxygen gas electrolytically produced by the electrolytic eluent generator to form water and substantially eliminate gas from the eluent stream. The amount of hydrogen gas can be determined by the current applied to the electrolytic gas generator 350 and the carrier water flow rate through the generation chamber 352. The hydrogen gas production can be matched to the oxygen gas production of the electrolytic eluent generator such that stoichiometric amounts of oxygen gas and hydrogen gas can be reacted at the electrolytic eluent generator.

Figure 4:
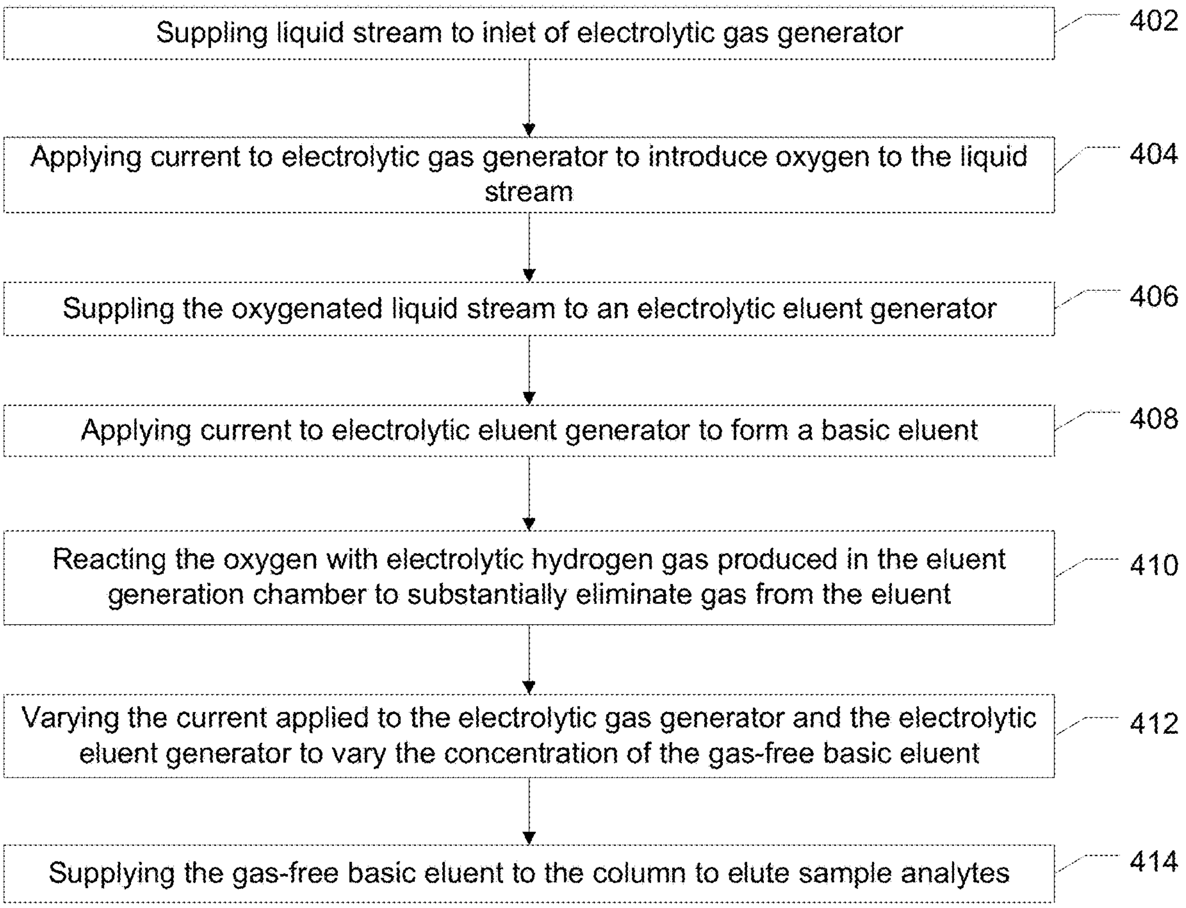
FIGS. 4 and 5 are flow diagrams illustrating methods for using a chromatography system including an eluent generation module, in accordance with various embodiments.

FIG. 4 is a flow diagram of a method of generating and using a gas-free base eluent. At 402, a liquid stream can be supplied to an inlet of an electrolytic gas generator, such as electrolytic gas generator 300 in FIG. 3A. At 404, a DC current can be applied across the outlet anode and the bulk solvent chamber cathode to generate $O_2$ at the outlet anode and introduce the $O_2$ into the liquid stream.

At 406, the liquid stream containing oxygen gas to the electrolytic eluent generator, such as electrolytic eluent generator 204 in FIG. 2. At 408, a DC current can be applied across the electrolyte chamber anode and the eluent generation chamber cathode to migrate electrolyte ions, such as $K^+$, $Na^+$, or $Li^+$, from the electrolyte chamber across the cation exchange connector to form the base eluent in the eluent generation chamber. At 410, the oxygen can react with the hydrogen formed in at the eluent generation chamber cathode to produce the gas-free base eluent.

At 412, the concentration of the base in the gas-free base eluent can be varied by varying the DC current applied to the eluent generation chamber. Additionally, the DC current applied to the electrolytic gas generator can be varied to match the amount of oxygen produced by the electrolytic gas generator with the hydrogen formed at the electrolytic eluent generator.

At 414, a sample can be injected into the eluent stream supplied to a chromatography column, the sample can be retained at least in part by the chromatography column, and the sample analytes can be eluted from the chromatography column using the gas-free base eluent and varying the concentration of the base. The sample analytes can be detected using a detector and/or analyzed by a mass spectrometer.

Figure 5:
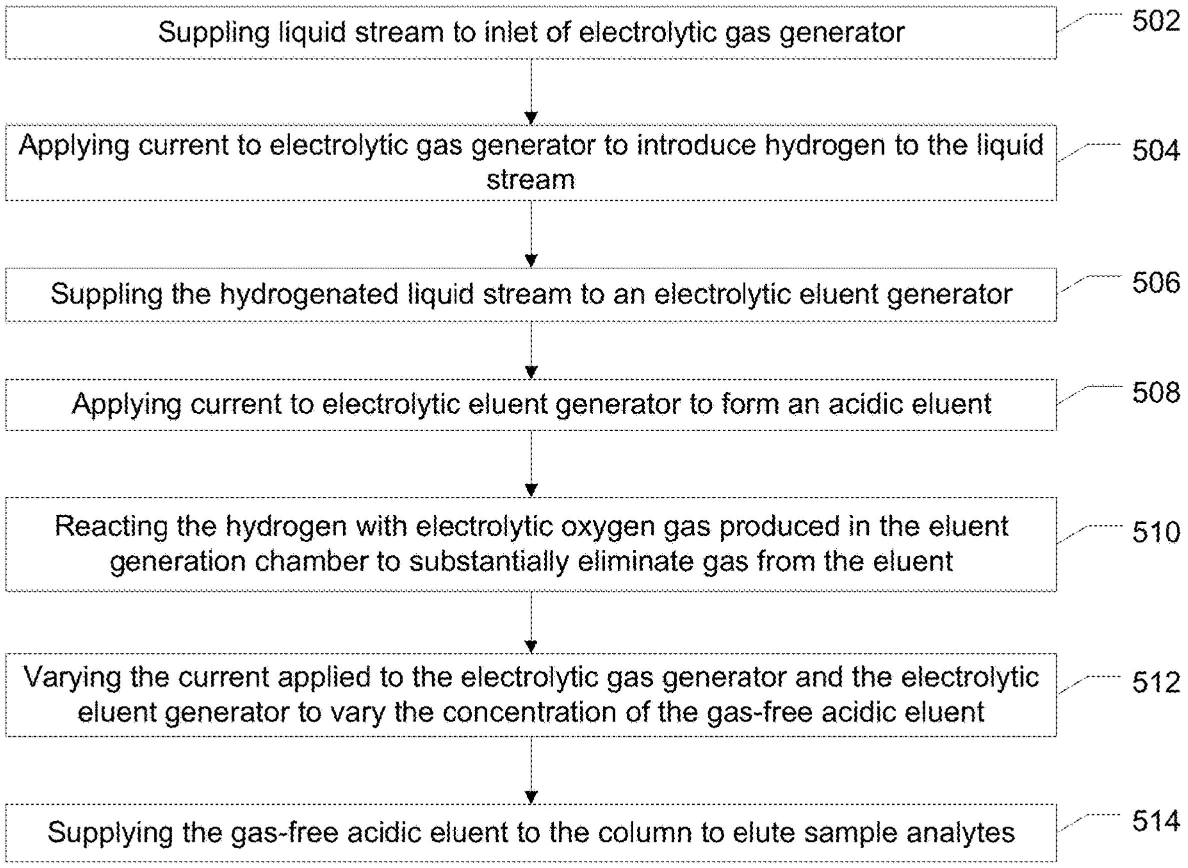

FIG. 5 is a flow diagram of a method of generating a gas-free acid eluent. At 502, a liquid stream can be supplied to an inlet of an electrolytic gas generator, such as electrolytic gas generator 350 in FIG. 3B. At 504, a DC current can be applied across the outlet cathode and the bulk solvent chamber anode to generate $H_2$ at the outlet cathode and introduce the $H_2$ into the liquid stream.

At 506, the liquid stream containing hydrogen gas to the electrolytic eluent generator, such as electrolytic eluent generator 204 in FIG. 2. At 508, a DC current can be applied across the electrolyte chamber cathode and the eluent generation chamber anode to migrate electrolyte ions, such as carbonate, phosphorate, acetate, or methanesulfonate, from the electrolyte chamber across the anion exchange connector to form the acid eluent in the eluent generation chamber. At 510, the hydrogen can react with the oxygen formed in at the eluent generation chamber anode to produce the gas-free base eluent.

At 512, the concentration of the acid in the gas-free acid eluent can be varied by varying the DC current applied to the eluent generation chamber. Additionally, the DC current applied to the electrolytic gas generator can be varied to match the amount of hydrogen produced by the electrolytic gas generator with the oxygen formed at the electrolytic eluent generator.

At 514, a sample can be injected into the eluent stream supplied to a chromatography column. The sample can be retained at least in part by the chromatography column, and the sample analytes can be eluted from the chromatography column using the gas-free acid eluent and varying the concentration of the acid. The sample analytes can be detected using a detector and/or analyzed by a mass spectrometer.

Example 1 is an eluent generation module for the production of a gas-less base eluent (KOH). The output of the eluent generation module was directed to a gas collection device to measure the amount of gas in the eluent. Table 1 shows the measured gas volume after 10 min at various voltage settings of the electrolytic gas generator and the electrolytic eluent generator.

TABLE 1

| Gas (Oxygen) Generator Set Current (mA) | Eluent (KOH) Generator Set Current (mA) | Eluent (KOH) Conc. (mM) | Measured Gas Volume (mL) |
|---|---|---|---|
| 20.1 | 20.1 | 50 | <0.05 |
| 40.2 | 40.2 | 100 | <0.05 |
| 60.3 | 60.3 | 150 | <0.05 |
| 80.4 | 80.4 | 200 | <0.05 |

Example 2 is an eluent generation module for the production of a gas-less base eluent (MSA). The output of the eluent generation module was directed to a gas collection device to measure the amount of gas in the eluent. Table 1 shows the measured gas volume after 10 min at various voltage settings of the electrolytic gas generator and the electrolytic eluent generator.

TABLE 2

| Gas (Hydrogen) Generator Set Current (mA) | Eluent (MSA) Generator Set Current (mA) | Eluent (MSA) Conc. (mM) | Measured Gas Volume (mL) |
|---|---|---|---|
| 60.3 | 60.3 | 150 | <0.2 |
| 80.4 | 80.4 | 200 | <0.2 |
| 100.5 | 100.5 | 250 | <0.2 |
| 100.5 | 80.4 | 200 | <0.2 |

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An eluent generation module comprising:
an electrolytic gas generator including:
a generation chamber having an inlet and an outlet;
an outlet electrode within the generation chamber;
a first ion exchange connector;
a bulk solvent chamber separated from the generation chamber by the ion exchange connector;
and a bulk solvent chamber electrode within the bulk solvent chamber; and
an electrolytic eluent generator fluidly downstream of the electrolytic gas generator including:
an electrolyte chamber containing an aqueous electrolyte solution;
an electrolyte chamber electrode within the electrolyte chamber;
a second ion exchange connector;
an eluent generation chamber separated from the electrolyte chamber by the second ion exchange connector; and
an eluent generation chamber electrode,
wherein liquid exiting the outlet of the electrolytic gas generator contains electrolysis gas generated in the generation chamber and is supplied to the electrolytic eluent generator, and wherein electrolysis gas delivered from the electrolytic gas generator combines with electrolysis gas generated at the eluent generation chamber electrode within the eluent generation module.

2. The eluent generation module of claim 1 wherein the electrolytic eluent generator is configured to generate an acid eluent, the second ion exchange connector including an anion exchange barrier, the electrolyte chamber electrode being a cathode, the eluent generation chamber electrode being an anode.

3. The eluent generation module of claim 2 wherein the electrolytic gas generator is configured to generate $H_2$ at the outlet to combine with 02 generated at the eluent generation chamber electrode, the first ion exchange connector including an anion exchange barrier, and the outlet electrode being a cathode, the bulk solvent chamber electrode being an anode.

4. The eluent generation module of claim 2 wherein the aqueous electrolyte solution includes carbonic acid, sulfuric acid, phosphoric acid, acetic acid, methanesulfonic acid, or any combination thereof.

5. The eluent generation module of claim 2 wherein the generation chamber includes an anion exchange bed.

6. The eluent generation module of claim 1 wherein the eluent generation module is configured to generate a base eluent, the second ion exchange connector including a cation exchange barrier, the electrolyte chamber electrode being an anode, the eluent generation chamber electrode being a cathode.

7. The eluent generation module of claim 6 wherein the electrolytic gas generator is configured to generate 02 at the outlet to combine with $H_2$ generated at the eluent generation chamber electrode, the first ion exchange connector including a cation exchange barrier, and the outlet electrode being an anode, the bulk solvent chamber electrode being a cathode.

8. The eluent generation module of claim 6 wherein the aqueous electrolyte solution includes potassium hydroxide, sodium hydroxide, lithium hydroxide, other alkali hydroxides, or any combination thereof.

9. The eluent generation module of claim 2 wherein the generation chamber includes an anion exchange bed.

10. The eluent generation module of claim 1 wherein the outlet electrode is a perforated platinum electrode.

11. A method of generating a gas-free base eluent, comprising:

supplying a liquid to an inlet of an electrolytic gas generator, the electrolytic gas generator including a generation chamber having the inlet and an outlet; an outlet anode within the generation chamber; a first cation exchange connector; a bulk solvent chamber separated from the generation chamber by the cation exchange connector; and a bulk solvent chamber cathode within the bulk solvent chamber;

applying a current across the outlet anode and the bulk solvent chamber cathode to generate $O_2$ at the outlet anode;

directing a liquid stream exiting the outlet of the electrolytic gas generator to an electrolytic eluent generator fluidly downstream of the electrolytic gas generator, the liquid stream containing the generated $O_2$, generator, the electrolytic eluent generator including an electrolyte chamber containing an aqueous electrolyte solution, an electrolyte chamber anode within the electrolyte chamber, a second cation exchange connector, an eluent generation chamber separated from the electrolyte chamber by the second cation exchange connector; and an eluent generation chamber cathode;

applying a current across the electrolyte chamber anode and the eluent generation chamber cathode to migrate electrolyte ions from the electrolyte chamber across the second cation exchange connector to form the base eluent in the eluent generation chamber; and reacting the $O_2$ with $H_2$ formed at the eluent generation chamber cathode to produce the gas-free base eluent.

12. The method of claim 11 wherein the aqueous electrolyte solution includes potassium hydroxide, sodium hydroxide, lithium hydroxide, other alkali hydroxides, or any combination thereof.

13. The method of claim 11 wherein the outlet anode is a perforated platinum anode.

14. The method of claim 11 wherein the gas-free base eluent contains less than about 0.2 ml of gas per ml of eluent.

15. The method of claim 14 wherein the gas-free base eluent contains less than about 0.1 ml of gas per ml of eluent.

16. The method of claim 15 wherein the gas-free base eluent contains less than about 0.05 ml of gas per ml of eluent.

17. The method of claim 11 further comprising:

injecting a sample onto a chromatography column;

varying the current applied across the generation chamber anode and the bulk solvent chamber cathode of the electrolytic gas generator and varying the current applied across the electrolyte chamber anode and the eluent generation chamber cathode to vary the concentration of the gas-free base eluent;

supplying the gas-free base eluent to the chromatography column;

eluting sample analytes from the chromatography column; and detecting the sample analytes using a detector.

18. A method of generating a gas-free acid eluent, comprising:

supplying a liquid to an inlet of an electrolytic gas generator, the electrolytic gas generator including a generation chamber having the inlet and an outlet; an outlet cathode within the generation chamber; a first anion exchange connector; a bulk solvent chamber separated from the generation chamber by the anion exchange connector; and a bulk solvent chamber anode within the bulk solvent chamber;

applying a current across the outlet cathode and the bulk solvent chamber anode to generate $H_2$ at the outlet cathode;

directing a liquid stream exiting the outlet of the electrolytic gas generator to an electrolytic eluent generator fluidly downstream of the electrolytic gas generator, the liquid stream containing the generated $H_2$, the electrolytic eluent generator including an electrolyte chamber containing an aqueous electrolyte solution, an electrolyte chamber cathode within the electrolyte chamber, a second anion exchange connector, an eluent generation chamber separated from the electrolyte chamber by the second anion exchange connector; and an eluent generation chamber anode;

applying a current across the electrolyte chamber cathode and the eluent generation chamber anode the migrate electrolyte ions from the electrolyte chamber across the second anion exchange connector to form the acid eluent in the eluent generation chamber; and reacting the $H_2$ with $O_2$ formed at the eluent generation chamber anode to produce the gas-free acid eluent.

19. The method of claim 18 wherein the aqueous electrolyte solution includes carbonic acid, sulfuric acid, phosphoric acid, acetic acid, methanesulfonic acid, or any combination thereof.

20. The method of claim 18 wherein the outlet electrode is a perforated platinum electrode.

21. The method of claim 18 wherein the gas-free acid eluent contains less than about 0.2 ml of gas per ml of eluent.

22. The method of claim 21 wherein the gas-free acid eluent contains less than about 0.1 ml of gas per ml of eluent.

23. The method of claim 22 wherein the gas-free acid eluent contains less than about 0.05 ml of gas per ml of eluent.

24. The method of claim 18 further comprising:

injecting a sample onto a chromatography column;

varying the current applied across the generation chamber cathode and the bulk solvent chamber anode of the electrolytic gas generator and varying the current applied across the electrolyte chamber cathode and the eluent generation chamber anode to vary the concentration of the gas-free acid eluent;

supplying the gas-free acid eluent to the chromatography column;

eluting sample analytes from the chromatography column; and detecting the sample analytes using a detector.

* * * * *